(12) United States Patent
Zhao et al.

(10) Patent No.: US 9,064,515 B2
(45) Date of Patent: Jun. 23, 2015

(54) NEAR FIELD TRANSDUCER AND HEAT SINK DESIGN FOR HEAT ASSISTED MAGNETIC RECORDING

(71) Applicant: Seagate Technology LLC, Cupertino, CA (US)

(72) Inventors: Tong Zhao, Eden Prairie, MN (US); John C. Duda, Bloomington, MN (US); Michael Christopher Kautzky, Eagan, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/286,279

(22) Filed: May 23, 2014

(65) Prior Publication Data

US 2014/0376344 A1   Dec. 25, 2014

Related U.S. Application Data

(60) Provisional application No. 61/838,862, filed on Jun. 24, 2013.

(51) Int. Cl.
*G11B 11/00* (2006.01)
*G11B 5/48* (2006.01)
(Continued)

(52) U.S. Cl.
CPC ............ *G11B 5/4866* (2013.01); *G11B 5/3163* (2013.01); *G11B 2005/0021* (2013.01);
(Continued)

(58) Field of Classification Search
CPC ...................... G11B 5/4866; G11B 2005/0021; G11B 5/314; G11B 5/6088; G11B 2005/001; G11B 7/1387; G11B 11/10554; G11B 11/1058; G11B 7/1384; G11B 7/1206; G11B 5/3116; G11B 11/10534; G11B 5/3133; G11B 13/08

USPC .......... 369/13.33, 13.32, 13.24, 13.14, 13.03, 369/13.02, 13.13, 13.22, 13.01, 13.35, 369/13.17, 112.27; 360/59, 125.31, 125.74; 29/603.6, 603.16, 603.07, 603.13
See application file for complete search history.

(56) References Cited

U.S. PATENT DOCUMENTS 7,786,086 B2 *  8/2010  Reches et al. ................. 530/300
8,077,558 B1 * 12/2011  Tsutsumi et al. .......... 369/13.33
(Continued)

FOREIGN PATENT DOCUMENTS

WO    WO2013163195    10/2013

OTHER PUBLICATIONS

File History for U.S. Appl. No. 14/313,197 as retrieved from the U.S. Patent and Trademark Office PAIR System on Jan. 9, 2015, 121 pages.
(Continued)

*Primary Examiner* — Ali Neyzari
(74) *Attorney, Agent, or Firm* — Hollingsworth Davis, LLC

(57) ABSTRACT

Apparatuses, systems, and methods are disclosed related to heat assisted magnetic recording. According to one embodiment, an apparatus that includes a heat sink region and a near field transducer region is disclosed. The near field transducer region is thermally coupled to the heat sink region. At least one of the heat sink region and the near field transducer region includes both an inner core and an outer shell. The inner core can be comprised of a non-plasmonic material and the outer shell can be comprised of a plasmonic material. In further embodiments, the inner core is comprised of a material having a relatively higher electron-phonon coupling constant and the outer shell is comprised of a material having a relatively lower electron-phonon coupling constant.

24 Claims, 6 Drawing Sheets

(51) Int. Cl.
*G11B 5/31* (2006.01)
*G11B 13/08* (2006.01)
*G11B 5/187* (2006.01)
*G11B 5/127* (2006.01)
*G11B 5/60* (2006.01)
*G11B 5/00* (2006.01)

(52) U.S. Cl.
CPC ...... *Y10T29/49025* (2015.01); *Y10T 29/49032* (2015.01); *G11B 13/08* (2013.01); *G11B 5/187* (2013.01); *G11B 5/1871* (2013.01); *G11B 5/127* (2013.01); *G11B 5/1278* (2013.01); *G11B 5/3133* (2013.01); *G11B 5/314* (2013.01); *G11B 5/6088* (2013.01)

(56) References Cited

U.S. PATENT DOCUMENTS

| | | | |
|---|---|---|---|
| 8,077,559 B1 | 12/2011 | Miyauchi et al. | |
| 8,339,740 B2 | 12/2012 | Zou et al. | |
| 8,351,307 B1 | 1/2013 | Wolf et al. | |
| 8,351,308 B2 * | 1/2013 | Chou et al. | 369/13.33 |
| 8,374,062 B2 * | 2/2013 | Tanaka et al. | 369/13.33 |
| 8,400,902 B2 * | 3/2013 | Huang et al. | 369/112.27 |
| 8,427,925 B2 * | 4/2013 | Zhao et al. | 369/112.23 |
| 8,451,705 B2 * | 5/2013 | Peng et al. | 369/112.27 |
| 8,477,454 B2 * | 7/2013 | Zou et al. | 360/125.31 |
| 8,514,673 B1 | 8/2013 | Zhao et al. | |
| 8,526,275 B1 | 9/2013 | Yuan et al. | |
| 8,565,049 B1 | 10/2013 | Tanner et al. | |
| 8,605,555 B1 | 12/2013 | Chernyshov et al. | |
| 8,634,280 B1 | 1/2014 | Wang et al. | |
| 8,670,215 B2 | 3/2014 | Zou et al. | |
| 8,681,590 B2 * | 3/2014 | Zhou et al. | 369/13.33 |
| 8,705,327 B2 * | 4/2014 | Matsumoto | 369/30.03 |
| 8,796,023 B2 * | 8/2014 | Reches et al. | 435/398 |
| 8,804,468 B2 * | 8/2014 | Zhao et al. | 369/13.33 |
| 8,817,407 B2 | 8/2014 | Wessel et al. | |
| 8,824,086 B2 * | 9/2014 | Peng et al. | 360/59 |
| 8,842,391 B2 * | 9/2014 | Zou et al. | 360/125.31 |
| 2004/0004792 A1 | 1/2004 | Hasegawa et al. | |
| 2007/0139818 A1 | 6/2007 | Shimazawa et al. | |
| 2008/0009434 A1 | 1/2008 | Reches et al. | |
| 2010/0214685 A1 | 8/2010 | Seigler et al. | |
| 2010/0291828 A1 | 11/2010 | Reches et al. | |
| 2011/0170381 A1 | 7/2011 | Matsumoto | |
| 2011/0205863 A1 | 8/2011 | Zhao et al. | |
| 2011/0286128 A1 | 11/2011 | Tsutsumi et al. | |
| 2011/0294398 A1 | 12/2011 | Hu et al. | |
| 2012/0045662 A1 | 2/2012 | Zou et al. | |
| 2012/0075965 A1 | 3/2012 | Tanaka et al. | |
| 2012/0075967 A1 | 3/2012 | Chou et al. | |
| 2013/0070576 A1 | 3/2013 | Zou et al. | |
| 2013/0258824 A1 | 10/2013 | Komura et al. | |
| 2013/0279315 A1 | 10/2013 | Zhao et al. | |
| 2013/0286804 A1 | 10/2013 | Zhao et al. | |
| 2013/0330573 A1 | 12/2013 | Zhao et al. | |
| 2013/0343167 A1 | 12/2013 | Zou et al. | |
| 2014/0004384 A1 | 1/2014 | Zhao et al. | |
| 2014/0043948 A1 | 2/2014 | Hirata et al. | |
| 2014/0050057 A1 | 2/2014 | Zou et al. | |
| 2014/0050058 A1 | 2/2014 | Zou et al. | |
| 2014/0226450 A1 | 8/2014 | Peng et al. | |

OTHER PUBLICATIONS

File History for U.S. Appl. No. 14/069,960 as retrieved from the U.S. Patent and Trademark Office PAIR System on Jan. 9, 2015, 100 pages.

File History for U.S. Appl. No. 14/083,845 as retrieved from the U.S. Patent and Trademark Office PAIR System on Jan. 9, 2015, 118 pages.

File History for U.S. Appl. No. 14/220,396 as retrieved from the U.S. Patent and Trademark Office PAIR System on Jan. 9, 2015, 80 pages.

Jan. 09, 2015 File History for U.S. Appl. No. 14/276,388 as retrieved from the U.S. Patent and Trademark Office Pair System on Jan. 09, 2015, 81 pp.

* cited by examiner

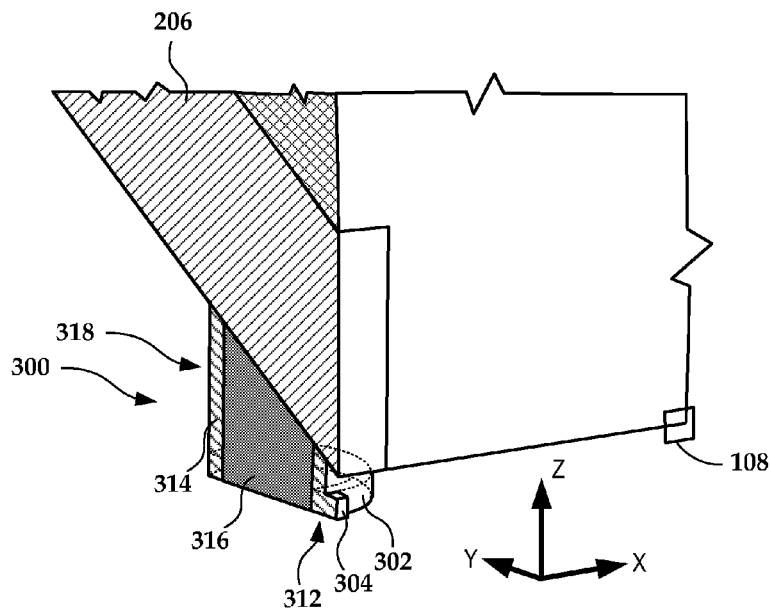
FIG. 3
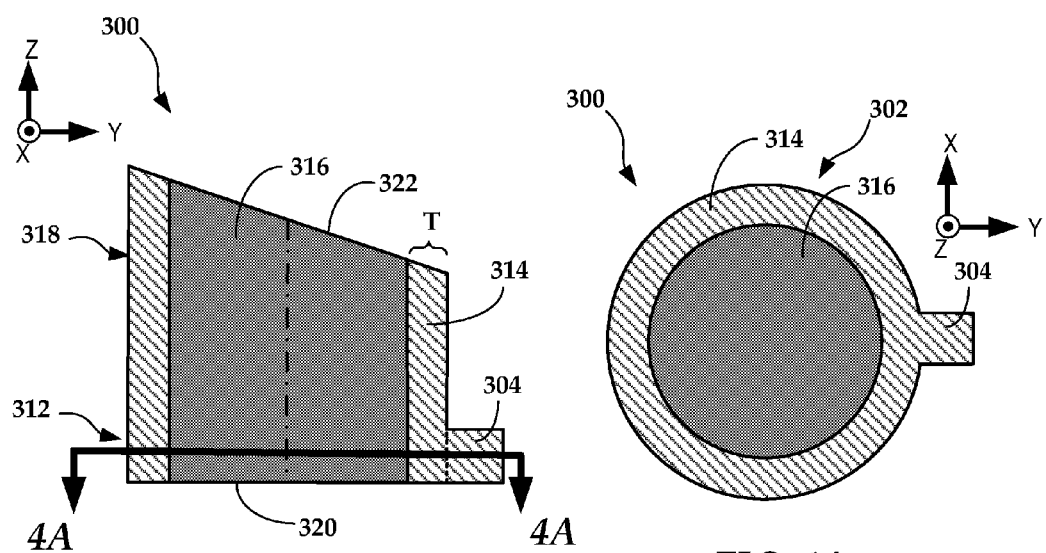
FIG. 4
FIG. 4A

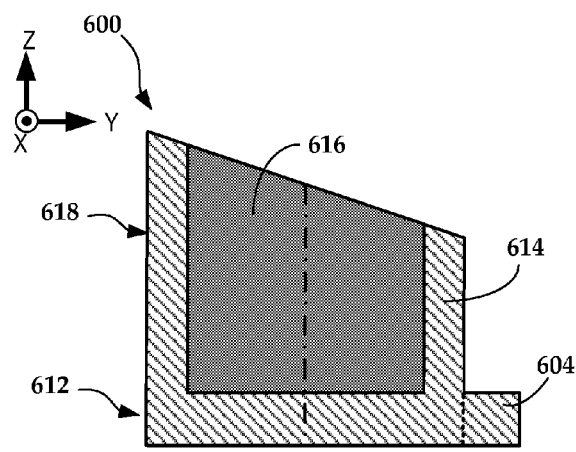
FIG. 7
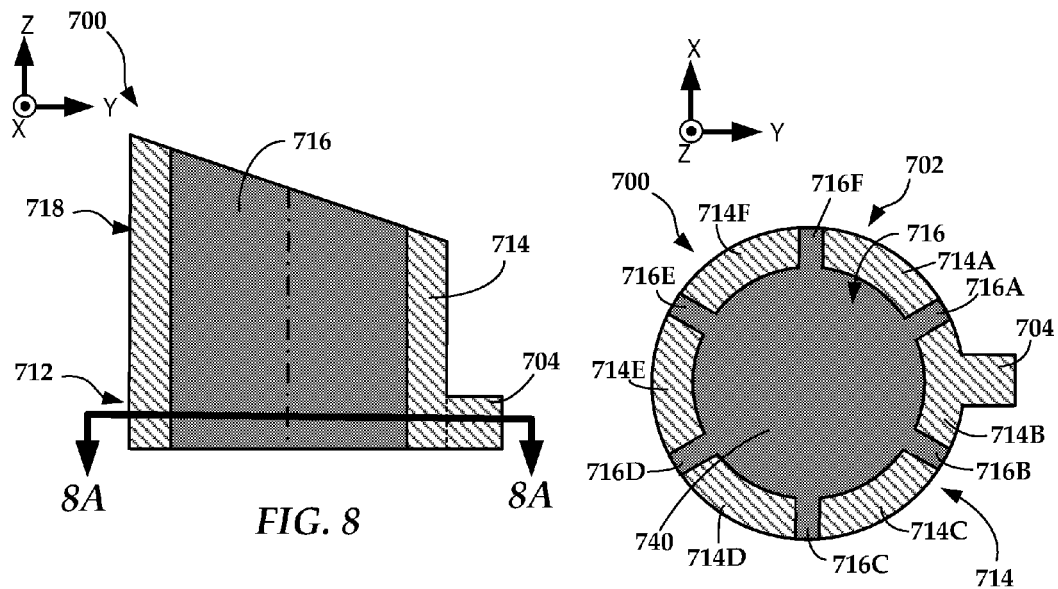
FIG. 8
FIG. 8A

NEAR FIELD TRANSDUCER AND HEAT SINK DESIGN FOR HEAT ASSISTED MAGNETIC RECORDING

RELATED PATENT DOCUMENTS

This application claims the benefit of Provisional Patent Application Ser. No. 61/838,862 filed on Jun. 24, 2013, to which priority is claimed pursuant to 35 U.S.C. §119(e) and which is hereby incorporated herein by reference in their entirety.

SUMMARY

The present disclosure is related to an apparatus that includes a heat sink region and a near field transducer region. The near field transducer region is thermally coupled to the heat sink region. At least one of the heat sink region and the near field transducer region includes both an inner core and an outer shell. The inner core is comprised of a non-plasmonic material and the outer shell is comprised of a plasmonic material. In further embodiments, the inner core is comprised of a material having a relatively higher electron-phonon coupling constant and the outer shell is comprised of a material having a relatively lower electron-phonon coupling constant.

In another embodiment, an apparatus includes a system configured to facilitate heat assisted magnetic recording. The system includes a heat sink region disposed therein and a near field transducer region thermally coupled to the heat sink region. At least one of the heat sink region and the near field transducer region includes both an inner core and an outer shell. The inner core is comprised of a material having a relatively higher electron-phonon coupling constant and the outer shell is comprised of a material having a relatively lower electron-phonon coupling constant.

In another embodiment, a method involves forming a core of at least one of a near field transducer region and a heat sink region of a system for facilitating heat assisted magnetic recording from a non-plasmonic material and forming an outer shell of at least one of the near field transducer region and the heat sink region from a plasmonic material. In some instances, the material of the shell has a relatively lower electron-phonon coupling constant and the material of the core has a relatively higher electron-phonon coupling constant.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

FIG. 3 is a perspective cutaway view of an assembly including a near field transducer region and surrounding components according to an example embodiment;

FIGS. 4 and 4A are further cross sectional views of the assembly of FIG. 3;

FIGS. 5, 6, and 7 provide additional cross sections of the assembly according to various example embodiments;

FIGS. 8 and 8A are further cross sectional views of another embodiment of the assembly with a segmented outer shell.

DETAILED DESCRIPTION

Figure 1:
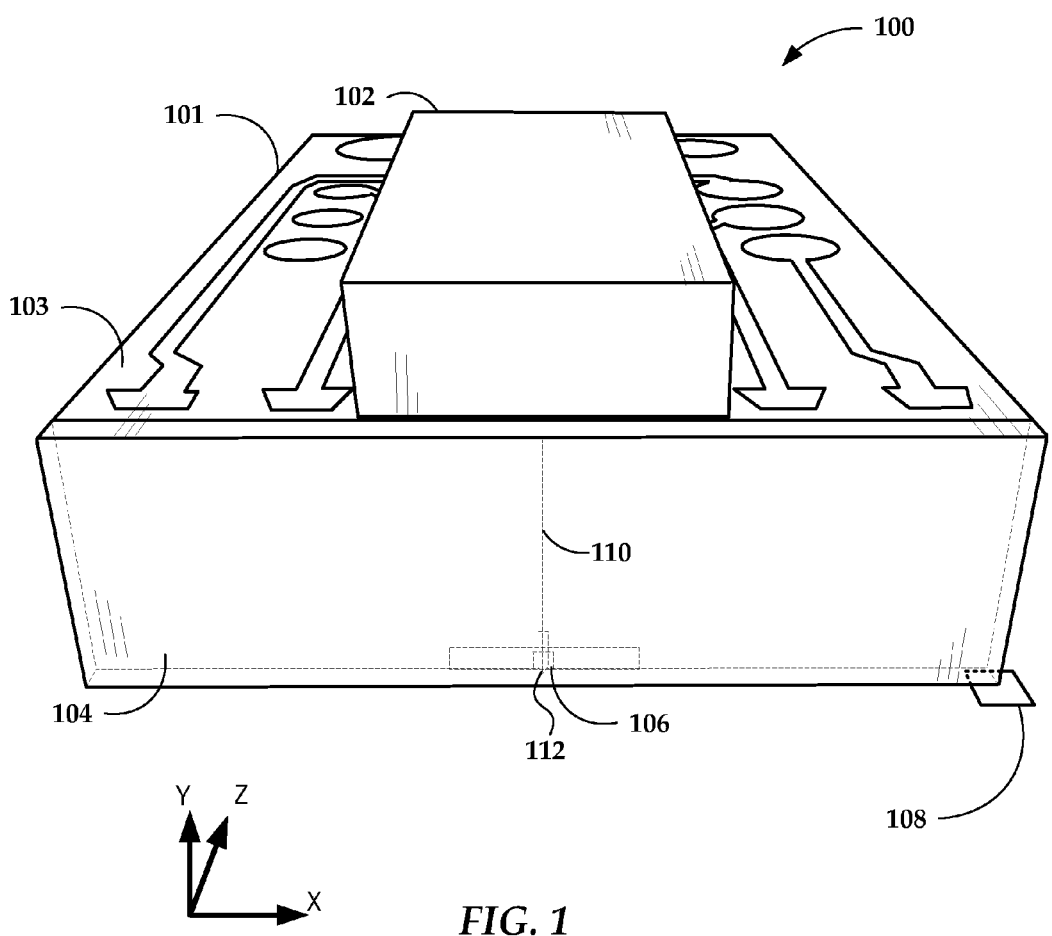
FIG. 1 is a perspective view of a slider assembly according to an example embodiment.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range. As used herein, the term "substantially" means within a few percent thereof. Thus, the term "substantially transverse" would mean within a few degrees of a perpendicular orientation.

The present disclosure is generally related to apparatuses, systems, methods, and techniques related to heat assisted magnetic recording ("HAMR"), sometimes referred to as thermally assisted magnetic recording ("TAMR"). A HAMR data storage medium uses a high magnetic coercivity that is able to overcome superparamagnetic effects (e.g., thermally-induced, random, changes in magnetic orientations) that currently limit the areal data density of conventional hard drive media.

A HAMR read/write element, sometimes referred to as a slider or read/write head, includes magnetic read and write transducers similar to those on current hard drives. For example, data may be read by a magnetoresistive sensor that detects magnetic fluctuations of a magnetic media as it moves underneath the sensor. Data may be written to the magnetic media by a write coil that is magnetically coupled to a write pole. The write pole changes magnetic orientation in regions of the media as it moves underneath the write pole. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a near field transducer (NFT) proximate a media-facing surface (e.g., air-bearing surface, contact surface). The NFT shapes and transmits the energy to a small region on the medium. The NFT is sometimes referred to as an optical antenna, surface plasmon resonator, etc., and may include a plasmonic metal such as gold, silver, copper, aluminum, plasmonic oxides and nitrides, etc., and alloys thereof. The NFT for a HAMR device is very small (e.g., on the order of 10 to 250 nm, or any value therebetween) and creates a localized region of high power density in the media through an electromagnetic interaction. This results in a high temperature rise in a small region on the media, with the region exceeding the Curie temperature having dimensions less than 100 nm. This also results in high temperature rise in the slider near the NFT due to optical losses in the delivery path.

In reference to FIG. 1, a perspective view shows HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a waveguide 110, are formed integrally within the slider body 101 (near a trailing edge surface 104 in this example) and function as an optical path that delivers energy from the laser diode 102 to the recording media via a NFT 112. The NFT 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
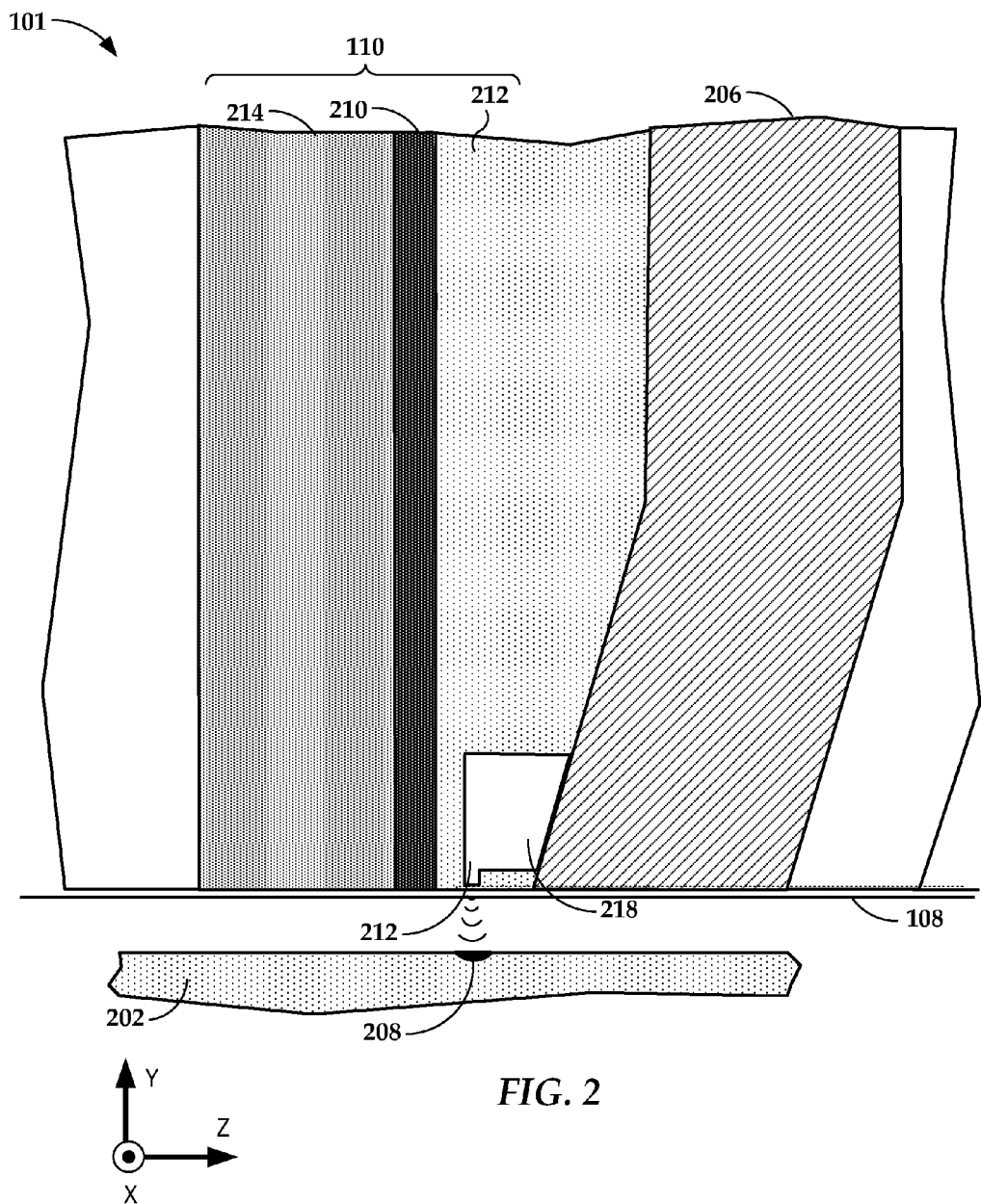
FIG. 2 is a cross sectional view of a slider assembly according to an example embodiment.

In FIG. 2, a cross-sectional view illustrates portions of the slider body 101 near the NFT 112 (FIG. 1) according to an example embodiment. In reference to FIG. 2 and the remainder of the FIGURES, the NFT 112 is referred to as a near field transducer region 212, which is part of an apparatus 200 that also includes a heat sink region 218. In this view, the near field transducer region 212 is shown proximate to a surface of magnetic media 202, e.g., a magnetic disk. The waveguide 110 delivers electromagnetic energy to the near field transducer region 212, which directs the energy to create a small hotspot 208 on the media 202. A magnetic write pole 206 causes changes in magnetic flux near the media facing surface 108 in response to an applied current. Flux from the write pole 206 changes a magnetic orientation of the hotspot 208 as it moves past the write pole 206 in the downtrack direction (z-direction).

The waveguide 110 includes one or more layers of material that form core 210 surrounding by cladding layers 212, 214. The core 210 and cladding layers 212, 214 may be made from dielectric materials such as $Al_2O_3$, SiOxNy, $SiO_2$, $Ta_2O_5$, $TiO_2$ or $Nb_2O_5$, etc. Generally, the dielectric materials are selected so that the refractive index of the core 210 is higher than refractive indices of the cladding layers 212, 214. This arrangement of materials facilitates efficient propagation of light through the waveguide 110.

The energy applied to the near field transducer region 212 of apparatus 200 to create the hotspot 208 can cause a significant temperature rise in the near field transducer region 212. The near field transducer region 212 may be formed to include a peg, pin, bar, or other protrusion having relatively small dimensions in order to keep the generated plasmonic field small. The near field transducer region 212 is formed from a relatively soft plasmonic metal (e.g., Au, Ag, Cu, Al, and alloys thereof) that is susceptible to deformation and/or recession at high temperature. As a result, the heat sink region 218 may be formed proximate to or integral with the near field transducer region 212 (i.e. thermally coupled thereto) to dissipate heat and reduce protrusion of the near field transducer region 212. The heat sink portion 218 may be thermally coupled to other components (e.g., the write pole 206) in order to draw heat away from the near field transducer region 212. Heat reduction in the near field transducer region 212 can reduce the likelihood of peg recession and other failure modes that negatively impact the operational life of HAMR devices.

FIG. 3 shows a perspective view of an assembly 300 disposed adjacent the media-facing surface 108 and write pole 206 according to one embodiment. The assembly 300 includes a near field transducer region 312 and a heat sink region 318. It should be noted that although these regions are indicated with lead lines, the extent of these regions 312 and 318 can vary from embodiment to embodiment and are dependent upon various factors including, for example, the wavelength of light used for HAMR, the type of light path utilized, the materials selected for various components of the slider body, the index of refraction of the materials selected, etc.

The near field transducer region 312 includes a disk shaped enlarged region 302 and a peg region 304. The peg region 304 is connected to the enlarged region 302 and extends from the enlarged region 302 toward the media-facing surface 108. In the embodiment of FIG. 3, both the near field transducer region 312 and the heat sink region 318 are comprised of an outer shell 314 and an inner core 316. In some embodiments, the outer shell 314 can be comprised of a plasmonic material (e.g., Au, Ag, Cu, Al, and alloys thereof) and the inner core 316 can be comprised of a non-plasmonic material (e.g., W, Ta, Mo, Mg, Zn, Rh, Ir, Ru, Pt, Si, Fe, Co, Nb, Y, Zr, Ti, Pb, Cr, Ni, B, Mn, V, Tc, Cd, Hf, Sr, and various alloys thereof.)

In further embodiments, the inner core 316 can be comprised of a material having a relatively higher electron-phonon coupling constant such as one or more of W, Rh, Ru, Ni, Pt, Ti, and alloys thereof. For example, the relatively higher electron-phonon coupling constant can be anything higher the $2.0e17$ $W/m^3/K$. The outer shell 314 can be comprised of a material having a relatively lower electron-phonon coupling constant such as Au, Ag, Cu, Al, and alloys thereof. For example, the relatively lower electron-phonon coupling constant can be less than $5.0e16$ $W/m^3/K$. The material(s) of the outer shell 314 are relatively lower as compared to the material(s) of the inner core 316 (e.g., an order of magnitude lower).

As shown in FIG. 3, the peg region 304 is comprised of the material having a relatively lower electron-phonon coupling constant. The enlarged region 302 is comprised of both the outer shell 314 and the inner core 316. Thus, the enlarged region 302 includes both the material having a relatively lower electron-phonon coupling constant and the material having a relatively higher electron-phonon coupling constant.

The near field transducer region 312 is an epicenter of heat that is generated as a by-product of delivering laser energy to the HAMR media. The disclosed core/shell arrangement with the core comprised of material having a relatively higher electron-phonon coupling constant and the shell comprised of material having a relatively lower electron-phonon coupling constant allows for an improved thermal pathway to conduct heat from (and thus reduced temperatures in) the near field transducer region 312, in particular the peg region 304. As previously discussed, heat reduction in the near field transducer region 312 can reduce the likelihood of peg recession and other failure modes that negatively impact the operational life (performance, reliability, etc.) of HAMR devices. In particular, utilizing a core/shell arrangement such that the material having a relatively higher electron-phonon coupling constant is thermally coupled to the material having a relatively lower electron-phonon coupling constant allows the relatively higher electron-phonon coupling constant material of the core to effectively act as a thermal diode to receive and partition energy and act as a phonon channel to transfer energy away from the relatively lower electron-phonon coupling constant material of the near field transducer region 312 to the heat sink region 318.

FIG. 4 show a cross-section of the assembly 300 including the near field transducer region 312 and the heat sink region 318. FIG. 4A is a cross section extending through the near field transducer region 312 in a direction transverse to the cross section of FIG. 4. FIG. 4A illustrates the peg region 304 and the enlarged region 302 as well as outer shell 314 and inner core 316.

Although the heat sink region 318 is illustrated as formed integral with the near field transducer region 312, in some embodiments the two can be separate components that are disposed to thermally couple with one another. As discussed with reference to FIG. 3 previously, both the heat sink region 318 and the near field transducer region 312 include both the inner core 316 and the outer shell 314. Thus, both the heat sink region 318 and the near field transducer region 312 are comprised of material having a relatively higher electron-phonon coupling constant thermally coupled to material having a relatively lower electron-phonon coupling constant. In the illustrated embodiments, the peg region 304 is comprised entirely of material having a relatively lower electron-phonon coupling constant (e.g., Au, Ag, Cu, Al, and alloys thereof).

In FIGS. 4 and 4A, the inner core 316 extends from a surface 320 of the near field transducer region 312 to a surface 322 of the heat sink region 318. Similarly, the outer shell 314 extends from the surface 320 of the near field transducer region 312 to the surface 322 of the heat sink region 318. The outer shell 314 has a thickness T (FIG. 4) of between about 10 nm and about 75 nm in some embodiments. However, the thickness T as well as the size (e.g., height, diameter) of the near field transducer region 312 can vary from embodiment to embodiment and are dependent upon various factors including, for example, the wavelength of light used for HAMR, the type of light path utilized, the materials selected for various components of the slider body, the index of refraction of the materials selected, etc.

Figure 5:
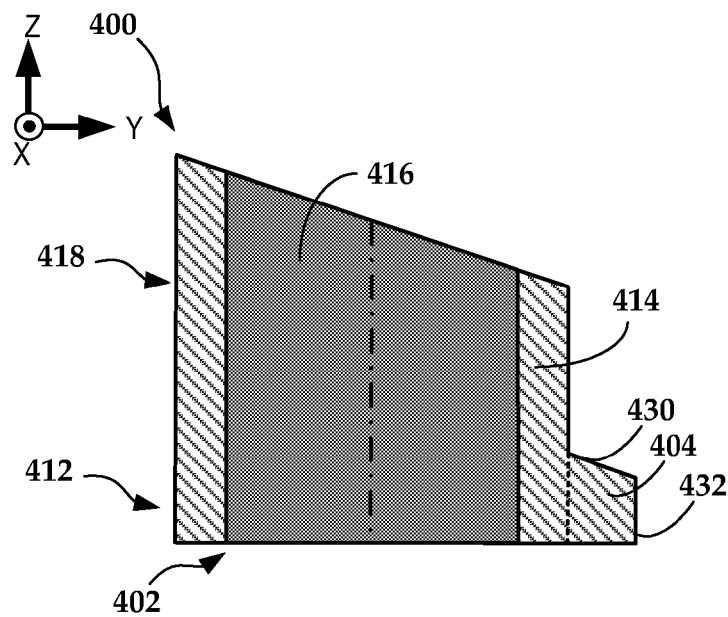

FIG. 5 shows a cross-section of another assembly 400 including a near field transducer region 412 and a heat sink region 418. Both the heat sink region 418 and the near field transducer region 412 include both the inner core 416 and the outer shell 414. Thus, both the heat sink region 418 and the near field transducer region 412 are comprised of material having a relatively higher electron-phonon coupling constant (material of the inner core 416) thermally coupled to material having a relatively lower electron-phonon coupling constant (material of the outer shell 414). A peg region 404 extends from a remainder of the near field transducer region 412 (e.g., enlarged region 402). In the embodiment of FIG. 5, a surface 430 of the peg region 404 extends diagonally (i.e. is sloped) between a side surface of the heat sink region 418 and an end surface 432 of the peg region 404. Thus, the peg region 404 has a cross-sectional area that increases adjacent the heat sink region 418 and the remainder of the near field transducer region 412 relative to an end portion of the peg region 404. The enlarged cross-sectional area adjacent the heat sink region 418 and the remainder of the near field transducer region 412 provides for increased ballistic electron line-of-site to the inner core 416.

Figure 6:
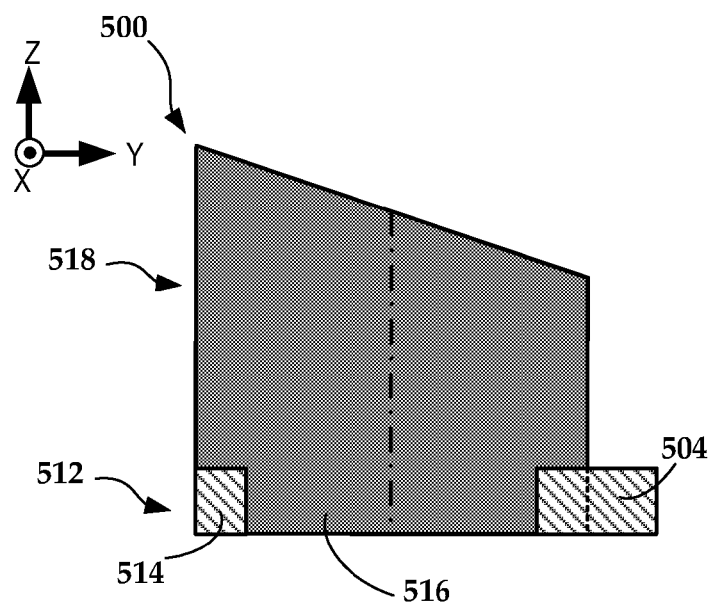

FIG. 6 shows a cross-section of another assembly 500 including a near field transducer region 512 and a heat sink region 518. In the embodiment of FIG. 6, only the near field transducer region 512 includes both the inner core 516 and the outer shell 514. The heat sink region 518 is comprised of material having a relatively higher electron-phonon coupling constant similar to the inner core 516 of the near field transducer region 512. The near field transducer region 512 is comprised of material having a relatively higher electron-phonon coupling constant (material of the inner core 516) thermally coupled to material having a relatively lower electron-phonon coupling constant (material of the outer shell 514). The peg region 504 is comprised entirely of material having a relatively lower electron-phonon coupling constant (e.g., Au, Ag, Cu, Al, and alloys thereof).

FIG. 7 shows a cross-section of an assembly 600 including a near field transducer region 612 and a heat sink region 618. In the embodiment of FIG. 7, only the heat sink region 618 includes both the inner core 616 and the outer shell 614. The near field transducer region 612 is comprised of material having a relatively higher electron-phonon coupling constant. The peg region 604 is comprised entirely of material having a relatively lower electron-phonon coupling constant (e.g., Au, Ag, Cu, Al, and alloys thereof). The heat sink region 618 is comprised of material having a relatively higher electron-phonon coupling constant (material of the inner core 616) thermally coupled to material having a relatively lower electron-phonon coupling constant (material the outer shell 614).

FIG. 8 provides a cross section of yet another assembly 700 including a near field transducer region 712 and a heat sink region 718. FIG. 8A illustrates the peg region 704 and the enlarged region 702 as well as an outer shell 714 and an inner core 716. As with the other illustrated embodiments, the inner core 716 can be comprised of material having a relatively higher electron-phonon coupling constant while the outer shell 714 can be comprised of a material having a relatively lower electron-phonon coupling constant.

FIG. 8A additionally illustrates that in some embodiments the outer shell 714 can be comprised of a plurality of segments 714A, 714B, 714C, 714D, 714E, and 714F. The inner core 716 can include a plurality of generally radially extending members 716A, 716B, 716C, 716D, 716E, and 716F that extend from a core 740 to separate the plurality of segments 714A, 714B, 714C, 714D, 714E, and 714F. Although this segmented structure is shown in reference to a cross-section through the near field transducer region 712, in other embodiments, the segmented structure can be used for the heat sink region 718.

Figure 9:
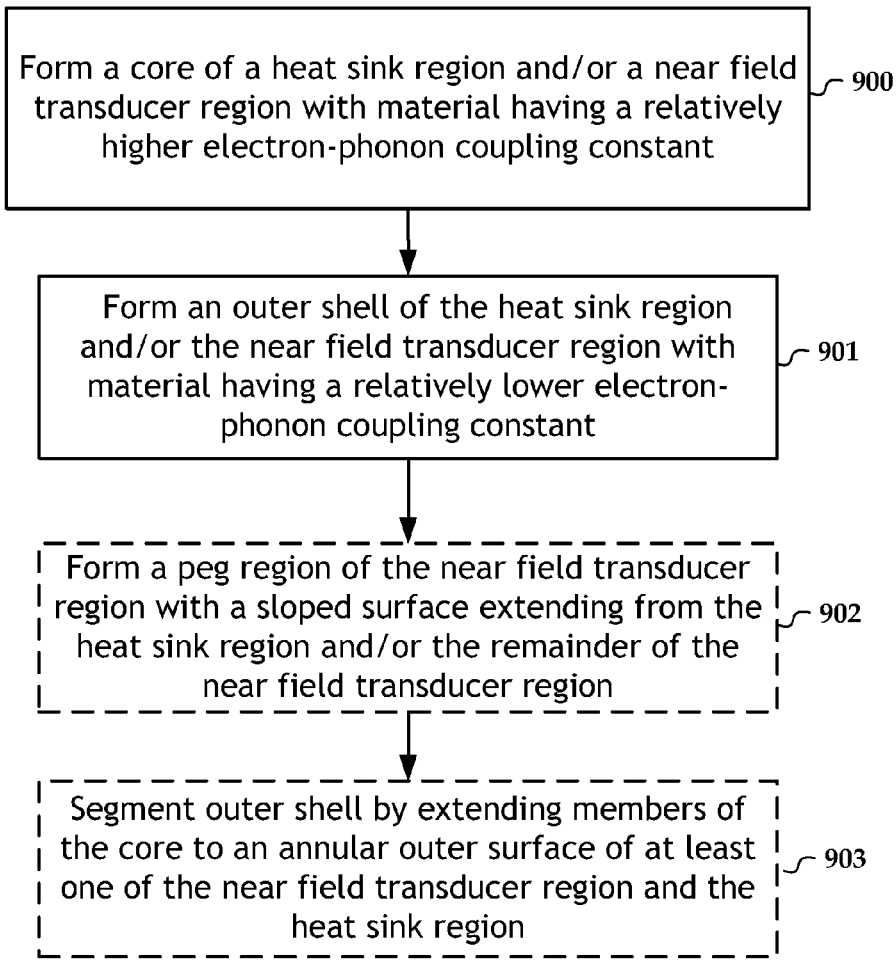
FIG. 9 is a flowchart illustrating a method according to an example embodiment.

FIG. 9 shows a flowchart that illustrates a method of forming a system for facilitating heat assisted magnetic recording according to an example embodiment. The method involves forming 900 a core of at least one of a near field transducer region and a heat sink region from a material having a relatively higher electron-phonon coupling constant. Additionally, the method involves forming 901 an outer shell of at least one of the near field transducer region and the heat sink region from a material having a relatively lower electron-phonon coupling constant.

In additional steps, the method of forming 902 the outer shell can further include forming a peg region of the near field transducer region with a cross-sectional area that increases adjacent the heat sink region and a remainder of the near field transducer region.

In additional or alternative steps, the method can involve segmenting 903 the outer shell by extending members of the core to an outer annular surface of at least one of the near field transducer region and the heat sink region.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
    a heat sink region; and
    a near field transducer region thermally coupled to the heat sink region, wherein at least one of the heat sink region and the near field transducer region includes both:
        an inner core comprised of a material having a first electron-phonon coupling constant; and
        an outer shell comprised of a material having a second electron-phonon coupling constant, wherein the first electron-phonon coupling constant is higher than the second electron-phonon coupling constant.

2. The apparatus of claim 1, wherein both the heat sink region and the near field transducer region include both the inner core and the outer shell.

3. The apparatus of claim 1, wherein the inner core extends from a surface of the near field transducer region to a surface of the heat sink region.

4. The apparatus of claim 3, wherein the outer shell extends from the surface of the near field transducer region to the surface of the heat sink region.

5. The apparatus of claim 1, wherein the material having the first electron-phonon coupling constant comprises one or more of W, Rh, Ru, Ni, Pt, Ti, and alloys thereof.

6. The apparatus of claim 5, wherein the material having the second electron-phonon coupling constant comprises Au, Ag, Cu, Al, plasmonic oxides, nitrides, and alloys thereof.

7. The apparatus of claim 1, wherein the near field transducer region comprises:
    a disk shaped enlarged region; and
    a peg region connected to and extending from the enlarged region.

8. The apparatus of claim 7, wherein the peg region has a cross-sectional area that increases adjacent the heat sink region and a remainder of the near field transducer region.

9. The apparatus of claim 7, wherein the peg region is comprised of the material having the second electron-phonon coupling constant.

10. The apparatus of claim 9, wherein the disk shaped enlarged region is comprised of the outer shell and the inner core.

11. The apparatus of claim 1, wherein the outer shell is comprised of a plurality of segments, and wherein the inner core includes a plurality of generally radially extending members that extend from a core to separate the plurality of segments.

12. An apparatus comprising:
    a system configured to facilitate heat assisted magnetic recording;
    a heat sink region disposed in the system; and
    a near field transducer region thermally coupled to the heat sink region, wherein at least one of the heat sink region and the near field transducer region includes both:
        an inner core comprised of a material having a first electron-phonon coupling constant; and
        an outer shell comprised of a material having a second electron-phonon coupling constant, wherein the first electron-phonon coupling constant is higher than the second electron-phonon coupling constant.

13. The apparatus of claim 12, wherein both the heat sink region and the near field transducer region include both the inner core and the outer shell.

14. The apparatus of claim 12, wherein the inner core extends from a surface of the near field transducer region to a surface of the heat sink region.

15. The apparatus of claim 12, wherein the near field transducer region comprises:
    a disk shaped enlarged region; and
    a peg region connected to and extending from the enlarged region.

16. The apparatus of claim 15, wherein the peg region has a cross-sectional area that increases adjacent the heat sink region and a remainder of the near field transducer region.

17. The apparatus of claim 15, wherein the disk shaped enlarged region is comprised of the outer shell and the inner core.

18. A method comprising:
    forming a core of at least one of a near field transducer region and a heat sink region of a system for facilitating heat assisted magnetic recording from a material having a first electron-phonon coupling constant; and
    forming an outer shell of at least one of the near field transducer region and the heat sink region from a material having a second electron-phonon coupling constant, wherein the first electron-phonon coupling constant is higher than the second electron-phonon coupling constant.

19. The method of claim 18, wherein forming the outer shell includes forming a peg region of the near field transducer region with a cross-sectional area that increases adjacent the heat sink region and a remainder of the near field transducer region.

20. The method of claim 18, further comprising segmenting the outer shell by extending members of the core to an outer annular surface of at least one of the near field transducer region and the heat sink region.

21. The apparatus of claim 1, wherein the first electron-phonon coupling constant is higher than the second electron-phonon coupling constant by an order of magnitude.

22. The apparatus of claim 1, wherein:
the first electron-phonon coupling constant is higher than about 2.0e17 W/m^3/K; and
the second electron-phonon coupling constant is lower than about 5.0e16 W/m^3/K.

23. The apparatus of claim 12, wherein the first electron-phonon coupling constant is higher than the second electron-phonon coupling constant by an order of magnitude.

24. The apparatus of claim 12, wherein:
the first electron-phonon coupling constant is higher than about 2.0e17 W/m^3/K; and
the second electron-phonon coupling constant is lower than about 5.0e16 W/m^3/K.

\* \* \* \* \*